No. 898,156.

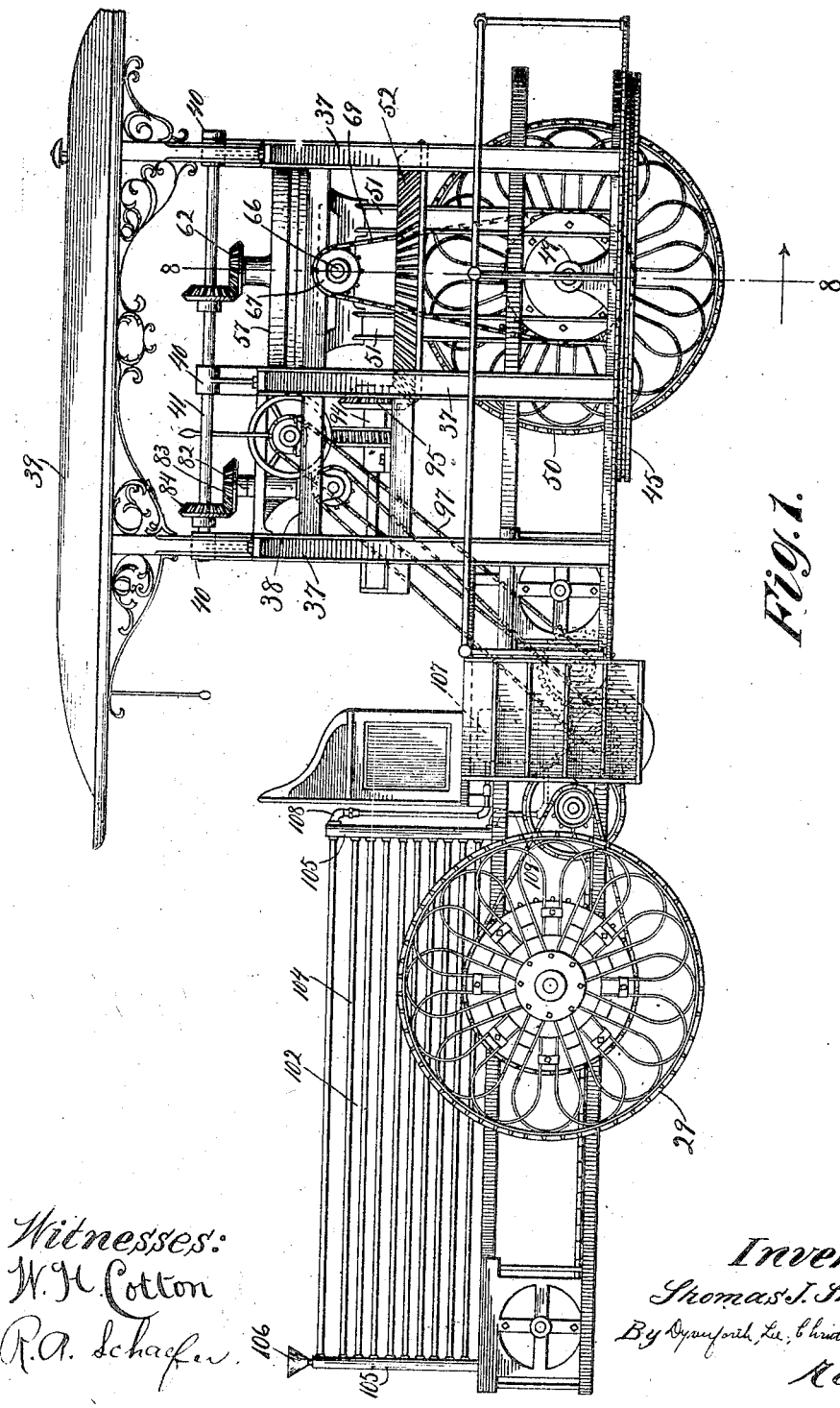

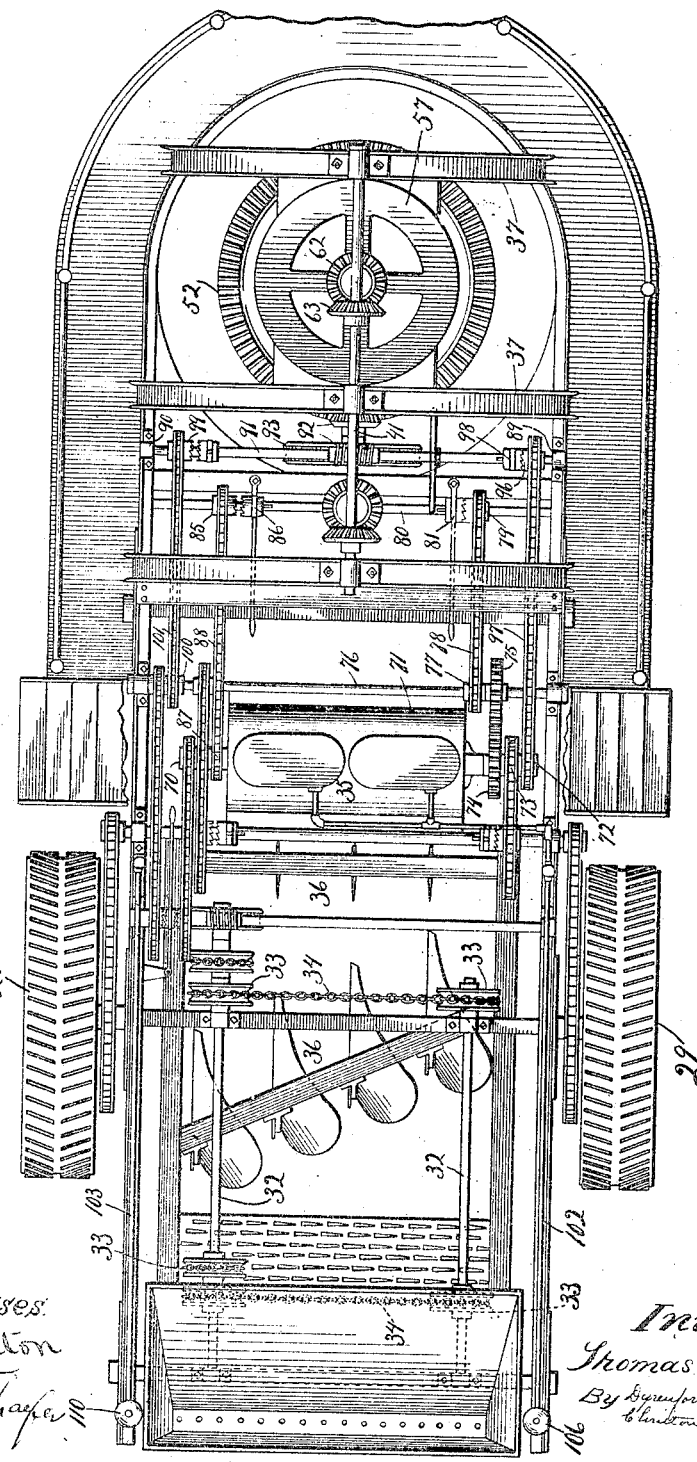

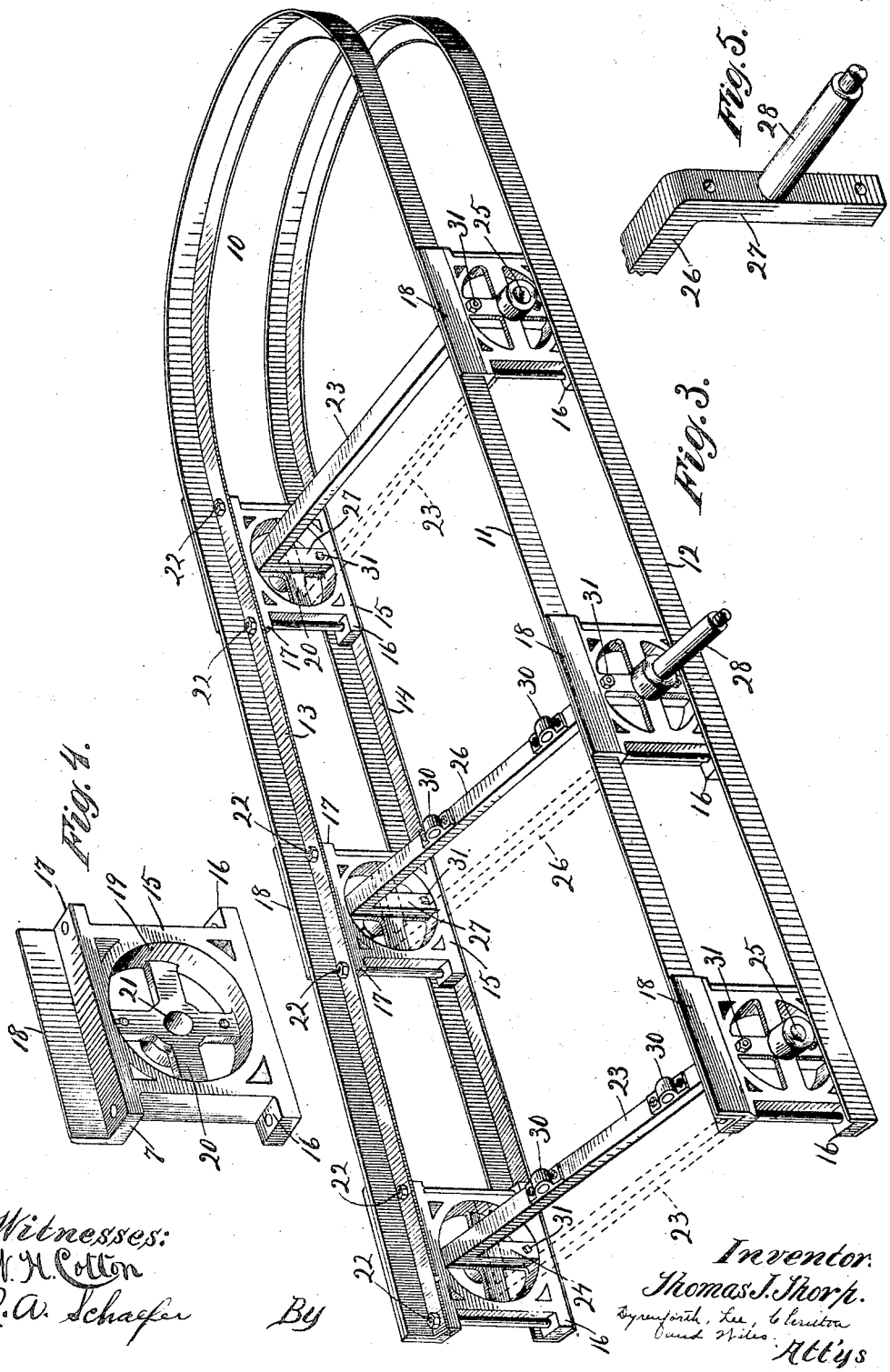

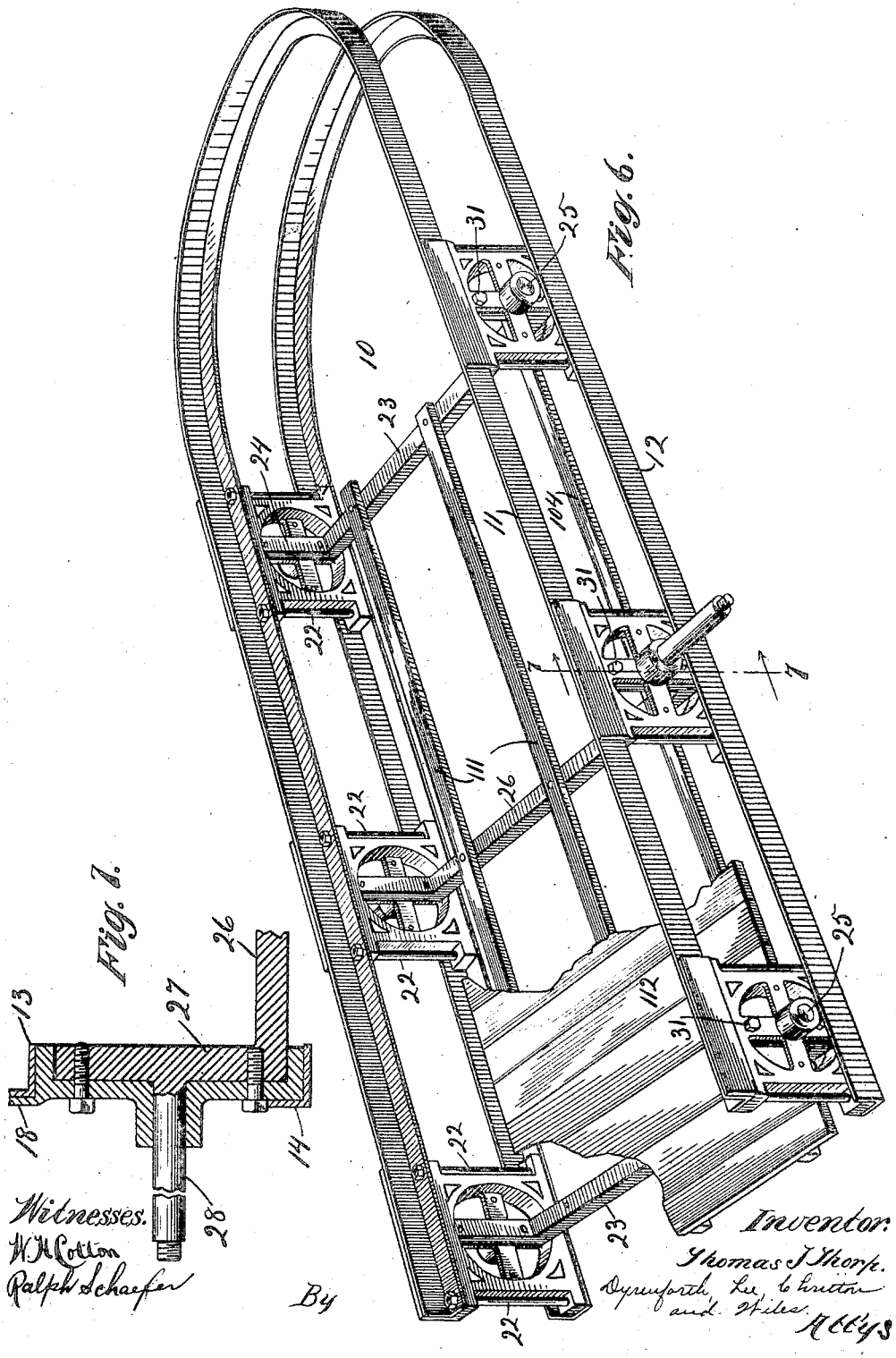

T. J. THORP.
MOTOR VEHICLE.
APPLICATION FILED JULY 12, 1907.

PATENTED SEPT. 8, 1908.

5 SHEETS—SHEET 5.

Witnesses:
W. H. Cotton
R. A. Schaefer

Inventor:
Thomas J. Thorp
By Dyrenforth, Lee, Chritton and Wiles
Attys.

UNITED STATES PATENT OFFICE.

THOMAS J. THORP, OF CORVALLIS, OREGON, ASSIGNOR TO T. J. THORP MANUFACTURING COMPANY, OF CORVALLIS, OREGON.

MOTOR-VEHICLE.

No. 898,156.　　　　Specification of Letters Patent.　　Patented Sept. 8, 1908.

Application filed July 12, 1907. Serial No. 383,499.

*To all whom it may concern:*

Be it known that I, THOMAS J. THORP, a citizen of the United States, residing at Corvallis, in the county of Benton and State of Oregon, have invented a new and useful Improvement in Motor-Vehicles, of which the following is a specification.

My invention relates particularly to motor-vehicles for industrial purposes, and my primary object is to provide a construction of machine which may be readily converted from an agricultural machine, such as a plow, harrower and seeder, into a self-propelled truck, and vice versa.

Other objects are to provide novel means for steering the machine and a novel construction and arrangement of the gasolene and water storage supply.

My improvements are illustrated in the accompanying drawings, in which—

Figure 8:
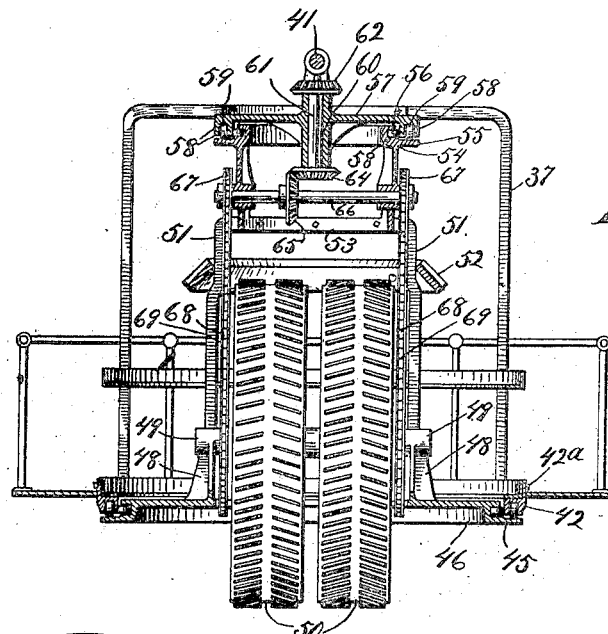
Figure 9:
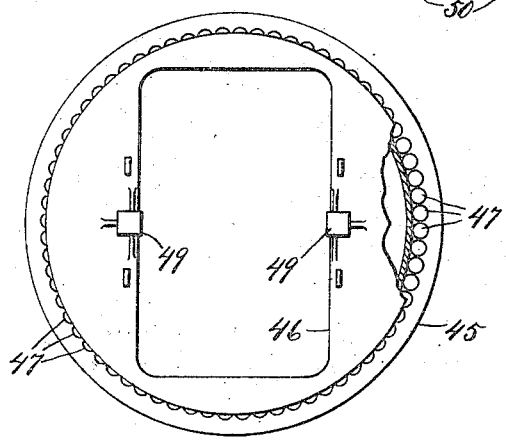
Figure 10:
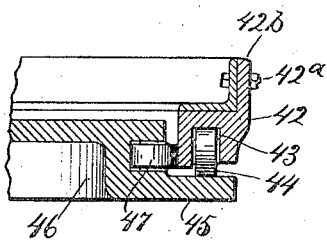

Figure 1 represents by a view in side elevation a machine constructed in accordance with my invention. Fig. 2 is a top plan view of the machine with the cab-roof removed.
Fig. 3 is a perspective view of the main supporting-frame of the machine showing the position the crank beams and axle occupy when the machine is equipped with the plowing, harrowing or seeding features. Fig. 4 is a perspective view of one of the spacing and reinforcing brackets. Fig. 5 is a similar view of one end of the crank-axle. Fig. 6 is a perspective view of the parts shown in Fig. 3 in the position they occupy when the machine is converted into a truck, showing a portion only of the truck-flooring in place. Fig. 7 is a section taken at the line 7 on Fig. 6 and viewed in the direction of the arrow. Fig. 8 is a section taken at the line 8 on Fig. 1 and viewed in the direction of the arrow. Fig. 9 is a plan view, partly broken, of the turntable upon which one end of the frame rests; and Fig. 10, an enlarged view in vertical section through the turntable illustrated in Fig. 8, and the frame resting upon it.

The main frame 10 of the machine comprises an upper member 11 and a lower member 12 preferably formed of angle-iron to provide the inwardly-extending horizontal flanges 13 and 14, respectively, each of the members 11 and 12 being preferably of the general U-shape shown. These frame-members are secured rigidly together by brackets or spacing blocks 15 each of the rectangular shape shown having lower lugs 16, top lugs 17 and a vertical flange 18, and provided centrally with a circular opening 19 in which is located a spider frame 20 having a journal-box 21. Each of the brackets 15 with its flange 18 embracing the upwardly-extending flange of the upper frame 13, is secured to the upper and lower frame-members 11 and 12, as by bolts 22 passing through the lugs 16 and 17. In each of the two end sets of brackets 15 is journaled a crank-beam 23 having arms 24 intermediate the ends of each of which is secured a stub-shaft 25, to fit in the adjacent box 21, each crank-beam fitting at its ends, to extend transversely of the frame, in the opening 19 in the opposed brackets. Journaled in the central set of brackets is a crank-axle 26, the arms 27 of which are provided intermediate their ends with stub-axles 28 which project through the boxes 21 of the brackets and on which the wheels 29 on opposite sides of the machine are journaled. The crank-axle and rear crank-beam are provided with spaced bearings 30 for receiving the shafts of lifting and heaving mechanism, hereinafter referred to.

When the machine is to be used as an agricultural machine it is necessary to have the main supports for the harrowing, plowing or seeding mechanism sufficiently high from the ground to permit it to be carried by the machine in operative position, so that when the machine is so used the crank beams and crank-axle are rotated in the openings in the brackets to cause their horizontal portions to be positioned above the axles, in which positions they are secured as by bolts 31 extending through the arms of each on opposite sides of the stub-shafts and stub-axles, respectively, and through the spider-frames of the brackets. Journaled in the bearings 30 are two parallel shafts 32 each equipped at its opposite ends with sheaves 33 carrying chains 34 operated from an engine 35, hereinafter referred to, for raising and lowering the plowing and harrowing mechanism 36 suspended therefrom to extend below the frame of the machine.

Rising from the frame-members 11 and 12 at opposite sides of the machine, near its front end, are three arch beams 37 braced near their upper ends by cross-beams 38, one only of which is shown. The beams 37 carry a roof-structure 39 and each has secured on its top surface, journal-boxes 40 in which a 1 drive-shaft 41, extending longitudinally of the machine, is journaled. Secured to the underside of the frame 10, as by bolts 42$^a$ passing through lugs 42$^b$ and the frame, is an annular ring 42 provided with an annular recess 43 in which roller bearings 44 are journaled to extend beyond the under surface of the ring. The ring 42 rests at its rollers upon the outwardly projecting annular flange 45 on a turntable 46 similarly equipped about its periphery with horizontally extending rollers 47 bearing against the inner wall of the ring 42 to prevent lateral thrust of the turntable. The turntable carries vertical brackets 48 having bearings 49 at which the pair of front traction wheels 50 are journaled, to effect the turning of the wheels horizontally through the turntable 46 for steering purposes. Rising from the turntable 46 are arch-beams 51 carrying intermediate their ends a large bevel gear 52, the beams being connected at their upper ends with a frame 53 rigid with a turntable 54. The turntable 54 has an outwardly extending flange 55 and is equipped with horizontal rollers 56. A disk-shaped plate 57 having annular depending flanges 58 carrying between them rollers 59 projecting below their undersides, and resting on the flanges 55, is fastened to the arch-beams 37. Journaled in a tubular extension 60 on the plate 57 to be concentric with the turntable 54 is a vertical shaft 61 carrying a bevel-gear 62 on its upper end meshing with a similar gear 63 on the shaft 41, and carrying a similar gear 64 on its lower end meshing with a bevel-gear 65 on a horizontal shaft 66, journaled in the frame 53. The outer ends of the shaft 66 carry sprocket-wheels 67 connected with sprocket-wheels 68 on the traction-wheels 50 by chains 69, whereby when the shaft 41 is rotated the wheels 50 are rotated.

The engine 35 for operating the machine may be of any suitable variety, but it is preferably of the gasolene-engine type. As shown the main-shaft 70 of the engine projects beyond both ends of the engine-casing 71 and carries on one end two sprocket-wheels 72 and 73 and a gear 74, the latter meshing with a gear 75 of the same number of teeth on a counter-shaft 76, this counter-shaft having a sprocket-wheel 77 connected by a chain 78 with a sprocket-wheel 79 idly operating on one end of a shaft 80 adapted to rotate the latter when a clutch 81 is operated to key the hub of the sprocket wheel to the shaft 80. The shaft 80 carries intermediate its ends a bevel-gear (not shown) meshing with a gear (not shown) on the lower end of a vertical shaft 82 equipped at its upper end with a bevel-gear 83 meshing with a second gear 84 on the shaft 41. The opposite end of the shaft 80 also carries a sprocket-wheel 85 controlled by a clutch 86, the sprocket-wheel 85 being connected with a sprocket-wheel 87 on the engine-shaft 70 through the medium of a chain 88, whereby by operating the clutches 81 and 86 the rotation of the wheels 50 to move the machine forward or backward may be effected.

Journaled transversely of the machine in bearings 89 and 90 is a shaft 91 carrying a worm 92 meshing with a worm-wheel 93 on a shaft 94 carrying a bevel-gear 95 engaging the gear-wheel 52. Thus when the shaft 91 is rotated the wheel 52 and consequently the turntables 46 and 54 and with them the traction-wheels 50 will be turned on their bearings to change the direction of travel of the machine. The shaft 91 carries on one end an idly-operating sprocket-wheel 96 connected with the sprocket-wheel 72 on the engine-shaft 70 by a chain 97, the operative engagement of the sprocket-wheel with the shaft being controlled by clutch-mechanism 98. The other end of the shaft likewise carries a clutch-controlled sprocket-wheel 99 connected with a sprocket-wheel 100 on the countershaft 76 by a chain 101. Thus by operating the clutches controlling the engagement of the sprocket-wheels 96 and 99 with the shaft 91 it may be turned in either direction to operate the wheel 52 and thus turn the turntables and traction-wheels in the desired direction. Secured on opposite sides of the machine, to the rear ends of the frame members 11 to extend longitudinally of the machine are a radiator 102 and a gasolene storage-coil 103. The radiator 102 is composed of a vertical series of pipes 104 connected together at their ends by tubular uprights 105 into which the ends of the pipes open and on the top of one of which is an inlet 106 through which the radiator may be supplied with water. The opposite ends of the radiator are connected with the water-jacket 107 of the engine as by pipes 108 and 109. The gasolene coil 103 is also composed of a vertical series of pipes connected together and intercommunicating and provided with an inlet 110 for supplying gasolene to it and an outlet for furnishing gasolene to the engine. By so providing these coils they serve the double purpose of storing gasolene and water and furnishing rigid sides for the truck when the machine is converted, as hereinafter explained.

When it is desired to convert the machine into a truck, the plowing, or other mechanism, carried by the machine may be readily removed together with the mechanism for supporting and operating this mechanism, thereby stripping the crank-beams and crank-axle of all the parts supported by them and leaving them free to be turned at their outer ends in the openings, after the bolts have been removed, to the depending position represented in Fig. 6, in which position they may be rigidly secured to the spider-frames 20, as by the bolts 31 and braced together as by longitudinal bars 111 resting on the crank-beams and crank-axle. The planking or plates 112 forming the floor of the truck may then be laid on the bars 111 and secured thereto in any desired manner. Thus by the use of the crank-beams and crank-axle the machine may be readily converted from an agricultural machine in which it is desired that the supporting cross-rods shall be comparatively high above the wheel-centers, to a truck in which the floor thereof is comparatively low.

By providing the depending arms on the ends of the crank-axle and crank-beams with the stub-shaft and stub-axles intermediate the ends of the arms, the crank-axle and crank-beams may be rigidly fastened to the brackets on opposite sides of the axle and thus great resistance to torsional strain is afforded.

What I claim as new, and desire to secure by Letters Patent, is—

1. In a self-propelled vehicle employing an engine, the combination of a supporting frame for the engine and wheels of the vehicle, and pipes for water and fuel supply mounted on said frame in position to form sides of the machine.

2. In a self-propelled vehicle employing an engine, the combination of a frame supporting the engine and wheels of the vehicle, a water-radiator extending longitudinally of the frame along one side of the vehicle and composed of a vertical series of intercommunicating pipes leading to the engine, and a fuel-supply coil extending longitudinally of the vehicle along the opposite side thereof and composed of a vertical series of intercommunicating pipes leading to the engine.

3. In a self-propelled vehicle employing an engine, the combination of a frame supporting the engine and wheels of the vehicle, a water-radiator extending longitudinally of the frame along one side of the vehicle and composed of tubular uprights and a vertical series of pipes each communicating with the interior of the uprights and leading to the engine-jacket, and a fuel-supply coil extending longitudinally of the vehicle along the opposite side thereof and composed of tubular uprights and a vertical series of pipes each communicating with the interior of the uprights and leading to the engine.

4. A main frame of the character set forth, provided at its sides with bearings and reversible cross-members equipped with bearings connected with said first-named bearings, and means for securing the cross-members in adjusted positions on the frame, said cross-members being adapted to afford a support for parts of the vehicle between its sides to permit it to be changed from an agricultural machine to a truck, and vice versa.

5. A main frame of the character set forth, provided at its sides with bearings and reversible cross-members equipped with bearings connected with said first-named bearings, said second-named bearings being equipped with stub-axles, and means for securing the cross-members in adjusted position on the frame, said cross-members being adapted to afford a support for parts of the vehicle between its sides to permit it to be changed from an agricultural machine to a truck, and vice versa.

6. A frame of the character set forth, equipped at its sides with bearings, cross-members extending between the side members of the frame and equipped with bearings fitting in said first-named bearings and rotatable therein, stub-axles carried by said second-named bearings, and means for securing said cross-members in adjusted position on the frame, said cross-members being adapted to afford a support for parts of the vehicle between its sides to permit it to be changed from an agricultural machine to a truck, and vice versa.

7. A main frame composed of upper and lower U-shaped spaced members bowed at their forward ends, brackets secured between said members, and U-shaped cross-pieces journaled on the brackets.

8. In a self-propelled convertible agricultural machine, a main supporting-frame having cross-pieces formed with arms set at an angle thereto and journaled on said frame intermediate the ends of the arms and means for releasably securing the cross-pieces in adjusted positions on said frame.

9. In a self-propelled convertible agricultural machine, a main supporting-frame having cross-pieces formed with arms set at an angle thereto and journaled on said frame intermediate the ends of the arms, one of said cross-pieces being provided with stub-axles on its opposite ends extending beyond the frame and means for securing the cross-pieces in adjusted positions on said frames.

10. In a self-propelled convertible agricultural machine, a main supporting-frame having cross-pieces formed with arms disposed at an angle thereto fitting in recesses in the frame-sides and journaled between the ends of the arms in bearings concentric with the recesses, and means for releasably securing the cross-pieces in adjusted positions on said frame.

11. In a self-propelled convertible agricultural machine, a main supporting-frame having cross-beams and a crank-axle, each having arms at its opposite ends fitting in recesses on the inner sides of the frame, each of said cross-beams having stub-shafts intermediate the ends of the arms journaled in the frame beyond the recesses and said crank-axle having stub-axles intermediate the ends of its arms journaled in the frame beyond the recesses and extending beyond said frame-sides, and means for releasably securing said crank-axle and cross-beams in adjusted positions on the frame.

12. In a self-propelled convertible agricultural machine, a main supporting-frame composed of an upper and a lower member and brackets secured between said members in spaced relation, cross-pieces constructed and arranged to be adjusted up and down on said brackets, and means for releasably securing the cross-pieces in adjusted position on the brackets, for the purpose set forth.

13. In a self-propelled convertible agricultural machine, a main supporting-frame composed of an upper and a lower member of angle-iron with brackets secured to the flanges thereof in spaced relation, each of said brackets having a circular opening therein and a bearing beyond said opening and concentric with it, and cross-beams and a crank-axle each having crank-arms extending from its opposite ends fitting in said openings, the cross-pieces having stub-shafts extending from their arms intermediate the ends thereof and journaled in said bearings and the crank-axle having stub-axles on its arms intermediate the ends thereof, journaled in said bearings and extending beyond the frame, for the purpose set forth.

14. In a motor-vehicle, the combination of a frame, a steering-wheel, a turntable connected with the steering-wheel and upon which the frame rests at one end, a frame rising from said turntable and connected at its upper end with a second turntable, and means for turning said last-named frame to turn the wheel in a horizontal plane for steering the machine.

15. In a motor-vehicle, the combination of a frame, uprights rising from the frame near one end, a steering-wheel, a turntable connected with the steering-wheel and upon which the frame rests at one end, a frame rising from said turntable, a second upper turntable secured to said second-named frame, and means for turning said last-named frame to turn the wheel in a horizontal plane for steering the machine.

16. In a motor-vehicle, the combination of a frame, uprights rising from the frame near one end, a steering-wheel, a turntable connected with the steering-wheel and upon which the frame rests at one end, a frame rising from said turntable, a second upper turntable secured to said second-named frame, a gear secured to said last-named frame intermediate the turntables, and means for turning said gear.

17. In a motor-vehicle, the combination of a frame, uprights rising from the frame near one end, a steering-wheel, a bearing-ring secured to the frame, a turntable upon which the frame rests at its bearing-ring, brackets extending upward from the turntable and in which the steering-wheel is journaled, a second frame rising from the turntable, a bearing-plate secured to the uprights, a turntable secured to the said second frame and upon which the bearing-plate bears, and means for turning said last-named frame to turn the wheel in a horizontal plane for steering the machine.

18. In a motor-vehicle, the combination of a frame, a steering-wheel, a bearing-ring on the frame provided with roller bearings, a turntable connected with the steering-wheel and upon which the frame rests at its bearing-ring, at one end, a frame rising from said turntable connected at its upper end with a second turntable, a bearing-plate on said first-named frame provided with roller-bearings at which the frame rests upon the said upper turntable, and means for turning said turntables to turn the wheel in a horizontal plane for steering the machine.

19. In a motor-vehicle, the combination of a frame, a steering-wheel, a bearing-ring on the frame provided with roller-bearings, a turntable carrying horizontal bearings bearing against said ring, said turntable being connected with the steering-wheel and upon which the frame rests at its said ring at one end, a frame rising from said turntable and connected at its upper end with a second turntable having lateral roller-bearings, a bearing-plate secured to the upper end of said first-named frame and having vertical roller-bearings at which this last-named frame rests upon said upper turntable, and means for turning said turntables to turn the wheel in a horizontal plane for steering the machine.

20. In a motor-vehicle, the combination of a frame, a steering-wheel, a bearing-ring secured to said frame and carrying vertical roller-bearings, a turntable connected with the steering-wheel and having lateral roller-bearings and a lateral flange, at which flange the said frame rests at its bearing-ring upon the turntable, a frame rising from said turntable and connected at its upper end with a second turntable having lateral roller-bearings and an annular flange projecting beyond the same, a bearing-plate secured to the upper end of the frame and provided with vertical roller-bearings at which the said first-named frame rests upon the flange of the said upper turntable, and means for turning said last-named frame to turn the wheel in a horizontal plane for steering the machine.

21. In a motor-vehicle, the combination of a frame, a steering-wheel, upper and lower turntables connected with the steering-wheel and upon which the frame rests at one end, vertical and horizontal roller-bearings between each of the turntables and the frame, and means for turning said turntables to turn the wheel in a horizontal plane for steering the machine.

22. In a motor-vehicle, the combination of a frame, an engine on the frame, a steering-wheel, a turntable connected with the steering-wheel and upon which the frame rests, at one end, a frame rising from said turntable and connected at its upper end with a second turntable, a bearing-plate secured to the upper portion of said first-named frame, roller-bearings confined between said bearing-plate and said turntable, a tubular extension on said plate, and a shaft journaled in said extension and operatively connected with said wheel and engine for rotating the wheel.

23. In a motor-vehicle, the combination of a frame, a steering-wheel, a bearing-ring provided with upwardly extending lugs at which the ring is secured to the frame, a turntable connected with the steering-wheel and upon which the frame rests at its ring, a frame rising from said turntable, a second turntable attached to said last-named frame and upon which the said first-named frame rests near its upper end, and means for turning said turntables, for the purpose set forth.

24. In a motor-vehicle, the combination of a U-shaped frame, a steering-wheel, a ring provided with lugs and secured to the under side of said U-shaped frame at said lugs, a turntable connected with the steering-wheel and upon which said frame rests at its said ring, a second frame rising from said turntable, a second turntable connected with the said last-named frame near its upper end and upon which the said first-named frame rests, and means for turning said turntables, for the purpose set forth.

25. In a motor-vehicle, the combination of a frame, an engine on the frame, a steering traction-wheel, a lower turntable supporting the frame on the wheel, an upper turntable, a frame connecting together the turntables, a horizontal shaft journaled in the second-named frame and connected with the wheel, a vertical shaft geared to said horizontal shaft, and means driven by the engine for rotating said shafts, for the purpose set forth.

26. In a motor-vehicle, the combination of a frame, an engine on the frame, uprights rising from the frame near one end and carrying bearings, a steering-traction wheel, turntables supporting the frame on the wheel, a shaft concentric with the turntables, a second shaft journaled in the bearings on the uprights and operatively connected with the vertical shaft, means for driving said second-named shaft from the engine, and means for communicating motion from said vertical shaft to the traction-wheel, for the purpose set forth.

27. In a motor-vehicle, the combination of a frame, an engine on the frame, a shaft carrying idle sprocket-wheels connected with the engine to rotate in opposite directions, clutch-mechanism for operatively connecting either of said sprocket-wheels with the shaft to rotate it, a traction steering-wheel driven by the engine and mounted on the frame to be rotated in a horizontal plane, and means connecting said shaft with said traction-wheel for turning the latter, to steer the machine, when the clutch-mechanism is operated.

THOMAS J. THORP.

In presence of—
RALPH SCHAEFER,
J. H. LANDES.